(12) United States Patent
Jollez et al.

(10) Patent No.: US 6,986,828 B2
(45) Date of Patent: Jan. 17, 2006

(54) PROCESS FOR PRODUCING LOW DP MICROCRYSTALLINE CELLULOSE

(75) Inventors: Paul Jollez, Sherbrooke (CA); Esteban Chornet, Sherbrooke (CA); Sylvain Cloutier, Rock Forest (CA)

(73) Assignee: Kemestrie Inc., Quebec (CA)

( * ) Notice: Subject to any disclaimer, the term of this patent is extended or adjusted under 35 U.S.C. 154(b) by 248 days.

(21) Appl. No.: 10/008,454

(22) Filed: Nov. 2, 2001

(65) Prior Publication Data

US 2002/0084044 A1 Jul. 4, 2002

Related U.S. Application Data

(60) Provisional application No. 60/245,148, filed on Nov. 3, 2000.

(51) Int. Cl.
*D21C 3/26* (2006.01)

(52) U.S. Cl. .............................. 162/19; 162/18; 162/29; 162/52; 162/60; 536/56; 536/57; 536/126

(58) Field of Classification Search .................... 162/16, 162/18, 19, 22, 29, 60, 65, 52, 76, 9, 100; 536/56, 57, 126
See application file for complete search history.

(56) References Cited

U.S. PATENT DOCUMENTS

| 3,954,727 A | * | 5/1976 | Toshkov et al. ............. 260/212 |
| 5,074,960 A | * | 12/1991 | Nimz et al. .................... 162/65 |
| 6,344,109 B1 | * | 2/2002 | Gross .......................... 162/100 |
| 2003/0089465 A1 | | 5/2003 | Schaible et al. |

FOREIGN PATENT DOCUMENTS

| EP | 0170530 | 7/1989 |
| JP | 7-102074 | 4/1995 |
| JP | 9-278674 | 10/1997 |
| SU | 1792942 | 2/1986 |
| WO | 99/60027 | 11/1999 |

OTHER PUBLICATIONS

International Preliminary Examination Report of International Application No. PCT/CA01/01550, filed Nov. 2, 2001.

* cited by examiner

*Primary Examiner*—Mark Halpern
(74) *Attorney, Agent, or Firm*—Darby & Darby

(57) ABSTRACT

A process for producing microcrystalline cellulose. The process comprising the following steps:
  a) preparation of a pulp by repulping,
  b) pressing of the pulp obtained in a),
  c) decompaction of the pulp obtained in b),
  d) feeding of the pulp obtained in c) into a pre-heated reactor,
  e) cooking of the pulp at a temperature, a time and a pressure allowing to obtain a pulp having a desired degree of polymerization,
  f) cooling and partial controlled depressurization of the reactor by purging the reactor, followed by a water injection into the jacket and directly into the reactor,
  g) filtering the pulp obtained in f),
  h) bleaching of the pulp obtained in g), and
  i) drying the pulp obtained in h).

The process allows the application of a controlled depressurization in step f), which in turn allows to keep the natural texture of the fibers and to obtain a cellulose having a low degree of polymerization.

13 Claims, 3 Drawing Sheets

TEMALPHA CELLULOSE TREATED BY A STEAM EXPLOSION PROCESS

PROCESS FOR PRODUCING LOW DP MICROCRYSTALLINE CELLULOSE

This application claims the benefit of U.S. Provisional Application No. 60/245,148 filed Nov. 3, 2000.

FIELD OF THE INVENTION

The present invention relates to a process for the production of microcrystalline cellulose.

DESCRIPTION OF PRIOR ART

Canadian application No. CA 2,313,261 (JOLLEZ) describes a process for the production of microcrystalline cellulose. In this process, the pulp obtained at the end of a thermo mechanical pulping step is submitted to a sudden and violent depressurisation and a shear force. This step results in the production of a non-selective fragmentation of the microcrystalline cellulose, which leads to the production of impurities by the oxidation during and after the explosion of the pulp.

Canadian patent No. CA 1,198,703 (DELONG) describes a process which generates a mixture of sugar and cellulose more or less degraded. This process uses wood as starting material and sulphuric acid, sulphur dioxide ($SO_2$) or hydrochloric acid.

Canadian patent No. CA 2,137,890 (BERGFELD) describes a process for converting cellulose fibers derived from a conventional process, into microcrystalline cellulose by using benign reactives like $O_2$ and $CO_2$. More particularly, it shows that a low degree of polymerisation can be obtained by the application of high-pressure at 140° to 180° C. for 15 minutes to 5 hours on aqueous suspensions of cellulose (solid/liquid ratio of 1/8 to 1/20) in the presence of $O_2$ and $CO_2$ in autoclaves in non-continuous mode.

SUMMARY OF THE INVENTION

A first object of the present invention is to provide a process for the manufacture of microcrystalline cellulose having a fibrous appearance and an integrity, which has been kept.

A second object of the present invention is to provide a process for the production of microcrystalline cellulose that does not necessitate the use of any mineral acids, sulphur dioxide or carbon dioxide.

A third object of the present invention is to provide a process for the production of microcrystalline cellulose in the absence of violent non-selective depressurisation.

The process according to the invention allows the application of a controlled depressurisation, which limits the production of non-desirable derivatives, which in turn allows a high yield of microcrystalline cellulose.

More precisely, the process according to the present invention comprises the following steps:

a) preparing a pulp by repulping,
b) pressing the pulp obtained in a),
c) decompacting the pulp obtained in b),
d) feeding the pulp obtained in c) into a pre-heated reactor,
e) cooking the pulp with the pre-heated reactor at a temperature, a time and a pressure selected to obtain a pulp having a desired degree of polymerisation,
f) cooling said pulp obtained in e) and partially depressurising the reactor by injecting water into said reactor,
g) filtering the pulp obtained in f),
h) bleaching of the pulp obtained in g), and
i) drying the pulp obtained in h).

One of the advantages of this process is that there is no disorganised destruction of the cell structure such as it occurs during a violent depressurisation in the processes using a thermo-mechanical pulping step. In fact, contrary to the thermo-mechanical pulping processes, there is no exposure of the burst material to air, light or hot metallic sides in the process of the present invention. Thus, there is no formation, or very limited formation of oxycellulose or non-desired functionalisation. Indeed, such formation is favoured, in thermo-mechanical processes, by the contact of the fibers to air and metals at the flashing temperature.

Another advantage of the process of the invention is that the filtration of the treated product is much faster, thanks to the absence of fine fragments resulting from the random and non-selective breaking of the cellulose chains during the violent depressurisation, which occurs during the thermo-mechanical treatments like steam explosion treatment.

A further advantage of the process of the invention is that controlled depressurisation prevents disorganised destruction of the cell and gives high yield of microcrystalline cellulose.

These higher yields explain the decrease of the suspended solids and dissolved pollutants in the water phase by more than half compared to a thermo-mechanical pulping process. The decrease is due to the absence of non-selective fragmentation in the process according to the invention and the absence of products of decomposition, which are generated by oxidation during and after the explosion in a thermo-mechanical pulping process.

The process of the invention also has the advantage of allowing more efficient brightening or bleaching. Such is due to the absence of fines resulting from the random breaking of the cells in a conventional steam treatment which retain the impurities and consume much more bleaching reactives. Under such conditions, the yield of operation is superior to 99% and the peroxide brightens the pulp without delignifying or contributing to the purification of the surrounding impure environment, like in the case of explosive treatments. The degree of brightness of the bleached final product is much higher than in any other treatment by thermo-mechanical pulping.

Another advantage of the process of the present invention is that it is carried out in a low acidity environment. The advantages of such low acidity lies in that it does not cause a massive depolymerization of the cellulose like in the case of the DELONG patent who works with wood and ends up with cellulose that has been cut in a non-selective fashion thereby, giving a mix of sugars and fragments of cellulose chains in the presence of numerous degradation products like furfural and other products coming from hemicelluloses or lignin.

The present invention and its advantages will be more easily understood after reading the following non-restrictive description of the preferred embodiments thereof, made with reference to the hereinbelow drawings.

BRIEF DESCRIPTION OF THE DRAWINGS

FIG. 2 is a photographic representation of a Temalfa cellulose of FIG. 1, treated by a steam explosion process.

DETAILED DESCRIPTION OF THE INVENTION

Figure 1:
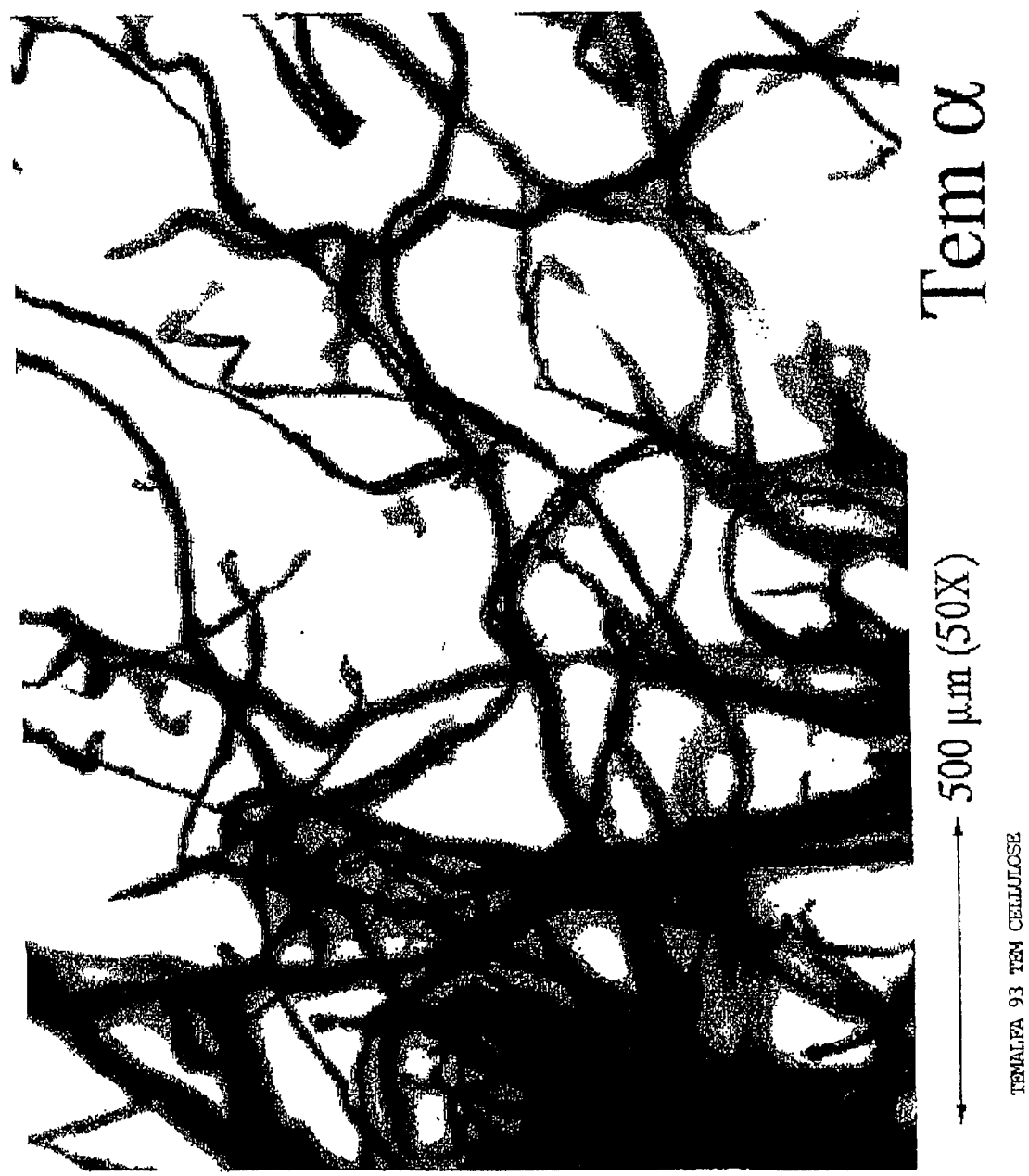
FIG. 1 is a photographic representation of a Temalfa cellulose 93 TEM prior to being processed.

As mentioned hereinabove, the process of the invention comprises the steps of:

a) preparing a pulp by repulping,
b) pressing the pulp obtained in a),
c) decompacting the pulp obtained in b),
d) feeding the pulp obtained in c) into a pre-heated reactor,
e) cooking the pulp at a temperatures a time and a pressure allowing to obtain a pulp having a desired degree of polymerisation,
f) cooling and partially depressurising the reactor injecting water into the reactor,
g) filtering the pulp obtained in f),
h) bleaching of the pulp obtained in g), and
i) drying the pulp obtained in h).

During the cooking process at high temperature, the lignocellulosic material undergoes controlled hydrolysis. The hydrolysis can be accelerated or slowed down by the presence of acids or bases during the cooking. At the same time, an oxidation can take place if the environment is favourable.

Under the effect of the temperature and the acidity of the reaction medium, an hydrolysis of hemicelluloses and lignin, if there are any left, can take place along with the hydrolysis of the amorphous zones of the cellulose. This hydrolysis will be more or less severe depending on the raw material, on the aqueous environment and obviously on the conditions of pressure, time and temperature applied during the treatment.

The hydrolysis can take place thanks to the organic acids such as acetic acid, freed by the thermal rupture of the acetyl groups of the hemicelluloses chains. Such organic acids may serve as catalysts for the hydrolysis of other products, notably cellulose.

This phenomenon is illustrated by the fact that the pH during steam cooking goes rapidly from about 4.5 to 3.5 depending on the type of the pulp. A kraft pulp from softwood, for an equal treatment, will give a lower pH than a sulphite pulp from softwood, because of the higher content of hemicelluloses in the kraft pulp. Obviously, the extent of such effect depends on the severity of the applied treatment.

Oxidation of the product present in the process can take place with more or less intensity depending on the time of exposure to air, the temperature, the environment and the accessibility to the treated product. This oxidation will lead to degradation of products hence, to a cellulose product of lower quality than desired as well as lower yields.

The non-controlled oxidation can also give coloured products. It may also degrade or alter the product resulting in the production of oxycelluloses for example.

Types of Celluloses that Can Be Treated by the Process of the Present Invention

The cellulose employed in the process of the present invention may be derived from a wide variety of cellulosic feedstock including but not limited to, wood and wood products, such as wood pulp fibres, non-woody paper-making fibres, from cotton, from straws and grasses, such as rice and esparto, from canes and reeds such as bagasse, from bamboos, from stalks with fibres, such as jute, flax, kenaf, cannabis, linen and ramie, and from leaf fibres such as abaca and sisal.

Suitable wood sources include softwood sources such as pines, spruces and firs, and hardwood sources such as oaks, eucalyptuses, poplars, beeches and aspens.

Bleached, partially bleached or non bleached celluloses from resinous or hardwoods, and resulting from chemical processes such as kraft process or sulphite as well as cellulose resulting from alternative processes such as steam explosion treatment may also be used.

Types of Additives that Can Be Used with the Present Process

Any suitable antioxidant may be used for the purpose of the present invention. More particularly, any other product having antioxidant function and that is acceptable with the desired applications of the finish products and compatible with the operation conditions may be used.

Preferably, these antioxidants are selected from the group consisting of:

Propyl gallate,
Hydroquinone,
Sodium sulfite, and
Citric acid.

Commercial products such as EDTA and Dequest from Monsanto may also be used in the process of the present invention.

Steps of the Process

The pulp used as the starting material of the process of the present invention is prepared by repulping the cellulose in water in the presence or absence of an additive, antioxidant or sequestrant, in a reactor mixed with the recirculation pump working at a 2% to 3% consistency The repulped pulp is pumped towards a pressing system such as a screw press or any other device allowing to drain and to lower the moisture of the fibre to 70% or less in weight (wet basis).

The humid pulp is then decompacted and aerated on a shredder or a coarse grinder. The reactor is then pre-heated to the temperature desired or to any other temperature chosen to reduce the condensation due to the heating of the walls during the treatment. This is done via the jacket or by injecting vapour directly and then emptying it before opening it to charge it.

The cooking reactor is then fed with wet grounded pulp. In continuous mode, the feeding is done through an airlock or by any other mechanism allowing to feed a vessel that is under pressure for example a co-axial system, The reactor is then closed when the apparatus in question works in batch mode. Vacuum can be applied before the steam feed to purge the gases present, such as air.

The reactor is then fed with steam directly up to a predetermined pressure. This method allows to rapidly reach a temperature between 200° and 235° C.

A purge of non-condensables, through the top of the reactor, in the case of a batch reactor is desirable if the purge was not carried out. Furthermore, steam must be re-introduced in the reactor to maintain the pressure.

The cooking is maintained during 4 to 25 minutes depending on the nature of the cellulose and the chosen working temperature. The goal is to reach a stable degree of polymerisation indicative of reaching the desired DP for MCC.

In a batch mode, the reactor is then rapidly cooled by an injection of water in the jacket and in the reactor itself. A preliminary depressurisation of the excess vapour can also be carried out before the injection of cooling water.

In a continuous mode, the treated product is pushed to one or several partially decompressed chambers for partial decompression. This insures the transport of the product towards the exit, without causing any explosion. The product is thereafter cooled down by water injection and further transported for the next step.

A variant of the decompression chambers may be carried out by means of a set of screw spindles and/or gears and/or inverted pump. This variant insures a rapid cooling of the product by a partial decompression with no explosion of the latter.

According to a preferred embodiment of the present invention, the cooking and cooling steps are carried out as follows. The humid cellulose cooks under pressurized water vapor (330 psi for example) and is transported into the cooking reactor via a screw press.

The cooking (or hydrolysis) lasts, for example, 15 minutes at a temperature of 220° C. The cooking time is determined by the rotation of the screw, which pushes the cellulose through the cooking reactor. When the cellulose reaches the other end of the cooking reactor, it is emptied into a vertical container, which contains water. This water is pumped into the vertical container by a pump capable of overcoming the pressure inside the cooking reactor.

The pressure of the water to be added into the vertical container must be equal or greater than 330 psi in order to penetrate into the system. When the liquid level inside the vertical container reaches the high level indicator, the water pump stops, and the lower valve (discharge valve) located under the container is opened. At this point, the vapor present inside the cooking reactor forces the liquid (water+cellulose) out of the system. This occurs without any vapor loss, because when the water-cellulose mixture reaches the low-level indicator of the vertical container, the output (discharge) valve is closed again.

The discharged liquid and cellulose go from a pressure of 330 psi (inside the container) to atmospheric pressure without vaporization of water, because the temperature of the water does not exceed 80° C.

There is only one release (discharge) step which is responsible for a pressure drop of almost 330 psi. There is thus, no vaporization of the water contained in the cellulose, which produces a random bursting of cellulose, as there is in a process using a thermo-mechanical pulping step.

In the past, the random bursting of cellulose was unavoidable because it was necessary to make the water-containing cellulose go from 220° C. at 330 psi to 100° C. at atmospheric pressure in a split second. After the closing of the discharge valve, the cycle begins all over again with the injection of water into the vertical container up to the high level mark.

In the present invention, the product is quickly depressurized by mixing it with water so as to avoid bursting of the cellulose, all the while maintaining an uninterrupted cooking in the cooking reactor. The cooking reactor is not affected by what is going on in the vertical container, because it never undergoes any no drop in temperature or pressure.

The water which one injects does consume a small amount of vapor since it passes from 20° C. to 80° C., all the while making it possible to isolate the cooking reactor from the atmospheric pressure. The discharge is done in cycles, while the cooking reactor works in a continuous mode (uninterrupted) for the hydrolysis.

The mixing can then start and the reactor is cooled down to around 60° C. by adding water to recuperate all the cellulose present in the reactor.

When the treated pulp is a pulp of sulphite or bleached kraft quality, it is sent directly to filtration before going to "brightening" and/or bleaching.

When the pulp is of intermediate quality, it may be treated with a caustic soda solution that is diluted in a way to eliminate leftover lignin and other impurities present. Then, it is filtered and washed before being sent to bleaching, which will be done according to the initial quality of the starting cellulose.

After filtration, the product (from Temalfa TEM 93 and Domtar Q90 cellulose) is brightened with hydrogen peroxide in the following conditions:

Peroxide: 2% w/w on dry mass;
Magnesium sulphate: 0.5% w/w on dry mass; and
Sodium hydroxide: 0.5% w/w on dry mass.

The treatment can be carried out at a temperature ranging between 60 and 120° C. under air or oxygen pressure reaching up to 120 psi.

The brightening and bleaching process can be adapted in function of the quality of the initial product, and in the more extreme cases, known bleaching methods can be used, such as hypochlorite or chlorine dioxide bleaching. The bleaching consistency will preferably be 25% but this can also be done at lower consistencies.

The bleached pulp is filtered and may be used as such or in a dry state for new applications comprising a new generation of microcrystalline cellulose of fibrous appearance, but having the same specifications as a classical microcrystalline cellulose in crystallinity index and DP.

The filtered bleached pulp can also be homogenised in water at a consistency going from 0.5 to preferably 3% and then filtered and washed to rid the residue of bleaching reactives. The pH of the solution, if needed, may be adjusted with hydrochloric acid (HCl) or ammonium hydroxide (NH$_4$OH) so to obtain a pH ranging between 5.5 to 7. This operation is done with an apparatus of the "blender" type or colloid mill, which allows the separation of microcrystalline cellulose particles to give non-colloidal microcrystalline cellulose.

After filtration, the suspension obtained is brought to a dryer of the type "spray dryer" to obtain the size required in the desired dryness of classical microcrystalline cellulose, for instance at a consistency of 10 to 20%.

Results Yield of MCC Obtained by the Process of the Invention

|  | ALPHA 93[1] | ALPHA 93[2] | KRAFT[1] | KRAFT[2] |
| --- | --- | --- | --- | --- |
| Repulping | 100 | 100 | 100 | 100 |
| Hydrolysis and washing | 95,0 | 87,3 | 88,0 | 83,2 |
| H$_2$O$_2$ and washing | 99,0 | 88,9 | 99,0 | 93,3 |
| NaOCl and washing (if needed) |  |  | 99,0 | 89,0 |
| Homogenization | 99,5 |  | 98,5 |  |
| Drying | 99,5 | 99,5 | 99,0 | 99,0 |
| Total Yield | 93,1 | 77,2 | 84,1 | 68,4 |

ALPHA 93[1]: results obtained from the process of the present invention
ALPHA 93[2]: results obtained from a process using a thermo-mechanical pulping step
KRAFT[1]: results obtained from the process of the present invention
KRAFT[2]: results obtained from a process using a thermo-mechanical pulping step There is an increase in the yield of the alpha-pulp of 20% and an increase in the yield of the kraft pulp of 23% compared to the thermo-mechanical pulping process using steam explosion treatment.

Figure 3:
FIG. 3 is a photographic representation of the Temalfa cellulose of FIG. 1, treated by the process of the present invention.

FIGS. 1 to 3 clearly shows the difference in composition of the microcristalline resulting from a process using a thermo-mechanical pulping step versus one resulting from the process of the present invention.

Applications of the Microcrystalline Cellulose Obtained by the Process of the Present Invention The bleached product that went through the blender and that was spray dried, has similar applications as the classical applications for MCC PH 101 (microcrystalline cellulose sold by FMC under the trademark AVICELL), that is for instance:

- Tableting (excipient with bonding properties);
- Cream used in pharmaceuticals and cosmetics;
- Fat replacer (lipid free ice cream and mayonnaise);
- Chromatography support; and
- Complexation with transition metals for enzyme immobilisation.

The microcrystalline cellulose obtained by the process of the present invention may be used for different applications. Indeed the process of the present invention allows the production of a microcrystalline cellulose having fibrous characteristics.

This cellulose is of very high purity and serves as a support for a new type of catalysts.

Since the structure of the product has a fibrous aspect and that, contrary to classical MCC, OH groups from the anhydroglucose molecule are not available, they will not react with the metals used to obtain a catalyst. Furthermore, in mixing this preparation with inorganic products for a sufficient mixing and drying time, the distribution of the active sites formed then dried and charred, will be different than the one obtained with a classical microcrystalline cellulose conferring new properties to the finished product. The spherical substrate of the catalyst, after charring, contains holes of controlled dimension making it different than the one obtained with colloidal MCC or with ground cellulose, which is, on top of that, limited by its initial inferior quality. Particularities of the Process According to the Invention for Obtaining Microcrystalline Cellulose Developed by Kemestrie The present section details the particularities of the process of the present invention. It summarises the various characteristics of the process of the present invention that renders it different from the one that are already known.

- Steam cooking of humidified cellulose that is saturated in water.
- Cooking without any mineral acids or dioxides.
- Presence or absence of additives (e.g. antioxidant).
- No explosion of the treated product.
- It is applicable to many types of cellulose of deciduous or resinous trees.
- Cooking of the humidified cellulose with saturated steam.
- Controlled cooking allowing to obtain the desired degree of polymerization of the cellulose.
- Very short time of treatment thanks to the instantaneous heating of the cellulose with saturated steam.
- Limited vapour consumption that is 1 to 1.2 ton of vapour per ton of dry cellulose.
- Contrary to the thermo-mechanical pulping, this new process prevents exposure of burst material to air, to light, or to the hot metallic sides. Therefor, there is no possible or very little formation of oxycelluloses, which is favoured in the presence of metals at these temperatures. Moreover, we know that when the substance is subjected to violent depressurisation such as going from 350 psi to atmosphere pressure in a few fractions of second, such as in the case of thermo-mechanical pulping, the substance is treated in a destructive fashion. This also has an abrasive effect on the material of the reactor located near the exit, thus increasing the chance for the treated product to be contaminated with metallic particles.
- The addition of certain cooking additives can help to avoid even more oxidation of the cellulose and its impurities.
- Very low formation of colour on the treated product with the recommended process.
- Increased efficiency of washing (which means reduction of water quantities used).
- A degree of brightness of the finished bleached product higher than any other treatment by steam explosion.
- If need be, a homogenisation of the finished product can be carried out and the breaking of the cellulose chains is done in a methodical manner contrary to what is done by classical thermo-mechanical pulping with the random explosion of cells as well as with the shear and the impact produced by the violent depressurisation.
- More precisely, with the alpha 93 pulp the yield of the initial dry pulp is 95% at the hydrolysis including the washing whereas with an explosive process where in the best of the cases as disclosed in patent no. CA 2,313,261 this yield is at best of 87% under similar conditions.
- With kraft pulp, the yield under similar conditions is of 88% versus 83% by steam explosion treatment.

EXAMPLES

A) TEMALFA 93 cellulose: small scale test without additives
B) TEMALFA 93 cellulose: small scale test with additives
C) Kraft cellulose: small scale test without additives
D) TEMALFA 93 on a commercial scale without additives.

Temalfa 93 cellulose from Tembec Company is obtained by the sulfite process from resinous trees. Given its quality, its standards of whiteness, its purity and its low content in resin, this pulp can be easily used in the production of carboxy-methyl cellulose, of methyl cellulose and of microcrystalline cellulose (MCC) for the grades 100 or 200. This pulp is characterised in that it gives a degree of polymerisation of the MCC in the vicinity of 225.

Temalfa 93 is the most commonly used feedstock around the world for the fabrication of microcrystalline cellulose in classical processes using mineral acid.

The composition of the Temalfa cellulose is the following:

| | |
|---|---|
| Pentosans: | 2.40% |
| Ashes: | 0.05% |
| S10 at 25 C.: | 8.6% |
| S8 at 25 C.: | 5.6% |
| Alpha cellulose | 92.5% |

The kraft cellulose from Donohue at 100% resinous has the following composition:

| | |
|---|---|
| Pentosans: | 7.00% |
| Ashes: | 0.36% |
| Alpha cellulose: | 89%. |

Domtar Q90 pulp may also be used in the context of the present invention.

| | |
|---|---|
| Brightness: | 90 |
| Viscosity: | 22 |

-continued

Shives: 0 PPM
Impurities: 0.4 PPM
Moisture: 10%
Alpha cellulose >90%

A—Example 1

Temalfa 93 Cellulose 1 kg of Temalfa 93 cellulose was repulped at a consistency of 2.5% in water, then partially dried with the help of a press and coarsely grounded to obtain a residual moisture of 60.3%.

From the above-obtained product, 229 g (equivalent to 90,913 g of cellulose) were introduced in a 24 liters reactor pre-heated with saturated steam. The steam is then introduced directly from the bottom of the reactor and a rapid purge is carried out to evacuate the non condensables.

Within 1 minute the product reached a temperature of 220° C. where it is maintained for 13 minutes. The pressure is then partially released and pressurised cold water is injected in the reactor in such a way as to allow rapid cooling of the pulp. Mixing is initiated at this stage to ensure a homogeneous discharge and to carry on to the next step of the treatment. The washed filtered product (252 g at 65.7% moisture) is white, slightly greyish.

The pH of the filtered solution is 5.3.

Using a sample of 59.7 g a brightening with hydrogen peroxide was carried out with 2% peroxide in the presence of 0.5% magnesium sulphate (on a dry pulp basis) at a pH of 10.5. The operation was carried out for 1 hour at 60° C.

After filtration and washing, 56.7 g of pulp is recovered (64.2% moisture).

A homogenisation of 55.7 g of brightened pulp gives, after filtration and washing, 50.7 g of pulp at 60.8% moisture (19.9 g of dry product).

Analysis:

DP (Degree of Polymerisation)=214

Cr.I (Cristallinity Index)=84.6

MS (Microcrystal Size)=46.6 Å

B—Example 2

Temalfa 93 Cellulose With Additives

A solution of 1% sodium sulphite is used at a ratio of 20/1 on 100 g of Temalfa cellulose. After pressing and coarse grinding, 214 g of soaked cellulose at 75.3% moisture is introduced into the pre-heated reactor.

The product is treated as in the example 1 for 12 minutes. After filtration and washing, 363 g of pulp at 75.3% moisture is obtained and the pH of the filtrate is 4.3.

357 g of bleached pulp obtained above is brightened with peroxide at the same conditions as in example 1. After washing and filtration, 253.3 g of pulp is recovered (moisture=65.5%).

A homogenisation is carried out with 250 g of brightened pulp described above and after filtration and washing, 237.7 g of pulp is recovered (64% moisture).

Analysis:

DP=219

Cr.I=88.9

MS=46.6 Å

C—Example 3

Kraft Cellulose 210 g of kraft cellulose humidified at 55.8% is treated at 220° C. for 13 minutes.

After filtration and washing, 366.4 g of cellulose are recovered at 77.7% moisture. The pH of the filtered solution is 4. The cellulose obtained is coloured, light brown/caramel.

A brightening step is carried out with the same conditions as previously described. A bleaching step is then carried out with hypochlorite with 1% hypochlorite (on dry cellulose basis) at a pH of 11 at 40° C. during 2 hours. The filtered bleached product has a weight of 237.5 g and a humidity of 66.2%. The homogenisation allowed the recovery of 240.4 g of pulp at 67.1% humidity.

Analysis:

DP=224

Cr.I=88.8

MS=43.1 Å

D—Example 4

Example at a Commercial Scale 120 kg of Temalfa 93 cellulose was repulped in the reactor mixed with cold water at a consistency of 3%. The operation is done in 6 steps of repulping of 20 kg each.

The pulp is then sent to a screw press of Atara/Spirac Spiropress U-260 brand to be dried up to a residual humidity of approximately 65%. The wet cellulose obtained goes through a moulding granulator that will decompact it.

The product obtained is loaded in a cylindrical stainless steel reactor. The reactor's volume is 2 cubic meters, After having closed the reactor, it is directly fed with steam to obtain the pressure required for the treatment. In just a few minutes the temperature into the reactor reaches 220° C.

After 12 minutes of cooking at 220° C., water is injected in the reactor in order to lower the temperature rapidly and allow a discharge of the cooking product. The discharge of the reactor is done several times with water injection to allow for a complete recuperation of the product.

4 cubic meters of water are required to complete this operation.

A rotating filter of 0.9 meter diameter and 0.6 meter length is then used for the filtration and the washing of the cellulose that is obtained.

The product has a fibrous aspect, reflecting from a non-destructive process. It is whitish Analysis:

DP=214

Cr.I=85.2

MS=46.6 Å.

E—Example 5

Microcrystalline Cellulose Manufacture in Continuous Mode 20 kg of Q 90 Domtar pulp was re-pulped at a consistency of 3% in water, than partially dried with the help of a press and coarsely ground to obtain residual moisture of 64%.

The reactor is heated up to 220° by direct steam injection and the rate of the screw is determined to have a residence time of 16 minutes.

The moist cellulose is fed to the hopper during 6 hours accordingly with the opening cycle of the ball valves. The cooked product is exits the reactor accordingly with water cycle. At the same time, water is injected into the vessel above the reactor. When the water reaches predetermined level into the vessel the ball valves opens and closes without loss of steam through the valve.

The product is then filtered on rotary filter and the sequence of washing and bleaching with hydrogen peroxide continues. After adjustment to pH 6.5 with ammonium hydroxide the microcrystalline cellulose is finally homogenised into a colloid mill and then dried into a commercial spray drier in order to give an average powder of 50 microns.

This MCC has a DP of 222, a bulk density of 0.29 and pass the ID and the compaction tests comparing with Avicell 101 standard, Although the present invention has been explained hereinabove by way of a preferred embodiment thereof, it should be pointed out that any modifications to this preferred embodiment within the scope of the present description is not done to alter or change the nature and scope of the present invention.

What is claimed is:

1. A process for preparing microcrystalline cellulose, characterized in that it comprises the steps of:
   a) preparing a pulp by repulping,
   b) pressing the pulp obtained in a) to remove water,
   c) decompacting the pulp obtained in b),
   d) feeding the pulp obtained in c) into a pre-heated reactor,
   e) cooking the pulp with the pre-heated reactor at a predetermined temperature, time, and pressure that are selected to obtain a pulp having a stable degree of polymerization, and wherein the cooked pulp is hydrolyzed to form microcrystalline cellulose without the use of any mineral acids,
   f) partially cooling the reactor by injecting water into said reactor,
   g) filtering the pulp obtained in f),
   h) bleaching the pulp obtained in g),
   i) drying the pulp obtained in h), and
   j) recovering said microcrystalline cellulose.

2. The process according to claim 1, characterized in that in step a) the repulping is carried out at a consistency of 2 to 3%.

3. The process according to claim 1, characterized in that in step e) the cooking is carried out with the addition of antioxidants.

4. The process according to claim 1, characterized in that in step e) the cooking is carried out at a temperature varying from 210° to 235° C.

5. The process according to claim 1, characterized in that in step e) the cooking time ranges between 4 and 25 minutes according to the desired degree of polymerization.

6. The process according to claim 1, characterized in that following the cooking step e), it further comprises a purification step.

7. The process according to claim 6, characterized in that the purification step consists of filtering the pulp obtained in step e).

8. The process according to claim 6, characterized in that the purification step consists of treating the pulp obtained in e) with a caustic soda solution.

9. The process according to claim 1, characterized in that following cooling step f), the process further comprises a bleaching step.

10. The process according to claim 9, characterized in that the bleaching step is carried out at a temperature ranging between 60° and 120° C. and at an air or oxygen pressure of 120 psi.

11. The process according to claim 10, characterized in that the bleaching step is carried out in the presence of peroxide, magnesium sulphate, sodium hydroxide, diethylenetriamine penta(methylenephosphonic acid) or a mixture thereof.

12. The process according to claim 1, characterized in that following the filtering step g), the process further comprises a homogenization step to obtain non colloidal microcrystalline cellulose.

13. The process according to claim 1, characterized in that it further comprises a washing step prior to the filtration of step g).

* * * * *